United States Patent
Benedetto et al.

(10) Patent No.: US 10,441,886 B2
(45) Date of Patent: Oct. 15, 2019

(54) DYNAMIC ALLOCATION OF CONTEXTUAL ASSISTANCE DURING GAME PLAY

(71) Applicant: Sony Interactive Entertainment LLC, San Mateo, CA (US)

(72) Inventors: Warren M. Benedetto, Aliso Viejo, CA (US); Landon Noss, Laguna Niguel, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 49 days.

(21) Appl. No.: 15/882,092

(22) Filed: Jan. 29, 2018

(65) Prior Publication Data

US 2019/0232168 A1     Aug. 1, 2019

(51) Int. Cl.
| | |
|---|---|
| *A63F 13/5375* | (2014.01) |
| *A63F 13/422* | (2014.01) |
| *A63F 13/67* | (2014.01) |
| *G10L 15/26* | (2006.01) |
| *G06K 9/00* | (2006.01) |

(52) U.S. Cl.
CPC ........ *A63F 13/5375* (2014.09); *A63F 13/422* (2014.09); *A63F 13/67* (2014.09); *G06K 9/00302* (2013.01); *G10L 15/265* (2013.01)

(58) Field of Classification Search
CPC .... A63F 13/5375; A63F 13/422; A63F 13/67; G06K 9/00302; G10L 15/265
See application file for complete search history.

(56) References Cited

U.S. PATENT DOCUMENTS

| | | | |
|---|---|---|---|
| 2008/0080552 A1* | 4/2008 | Gates | H04L 12/66 370/468 |
| 2009/0280909 A1 | 11/2009 | McEniry | |
| 2011/0106617 A1* | 5/2011 | Cooper | G06Q 30/02 705/14.49 |

(Continued)

FOREIGN PATENT DOCUMENTS

| | | |
|---|---|---|
| WO | WO 2017/205104 | 11/2017 |
| WO | PCT/US18/67693 | 12/2018 |

(Continued)

OTHER PUBLICATIONS

PCT Application No. PCT/US2018/067693 International Search Report and Written Opinion dated Mar. 5, 2019.

(Continued)

*Primary Examiner* — Kevin Y Kim
(74) *Attorney, Agent, or Firm* — Polsinelli LLP

(57) ABSTRACT

The present disclosure describes methods and systems directed towards a dynamic allocation of contextual assistance during gameplay. By analyzing user gameplay and reactions of a user while the user is participating in a video game, appropriate gameplay assistance can be assigned. The different assistance information can be offered and/or provided to the user based on a current state of the user performance within the game. The system and methods allow for customization of what type of gameplay assistance can be provided to each user and when the assistance should be provided. In this way there is a balance between assisting the user to minimize the level of frustration and letting the user experience the video game to minimize spoilers.

15 Claims, 7 Drawing Sheets

(56) References Cited

U.S. PATENT DOCUMENTS

2013/0116022 A1  5/2013  Davison et al.
2014/0324749 A1  10/2014 Peters et al.
2016/0093154 A1  3/2016  Bytnar et al.

FOREIGN PATENT DOCUMENTS

WO    PCT/US18/67716    12/2018
WO    WO 2019/14377     8/2019

OTHER PUBLICATIONS

PCT Application No. PCT/US2018/067716 International Search Report and Written Opinion dated Mar. 5, 2019.
U.S. Appl. No. 15/885,162, Warren M. Benedetto, Assignment of Contextual Game Play Assistance to Player Reaction, filed Jan. 31, 2018.

* cited by examiner

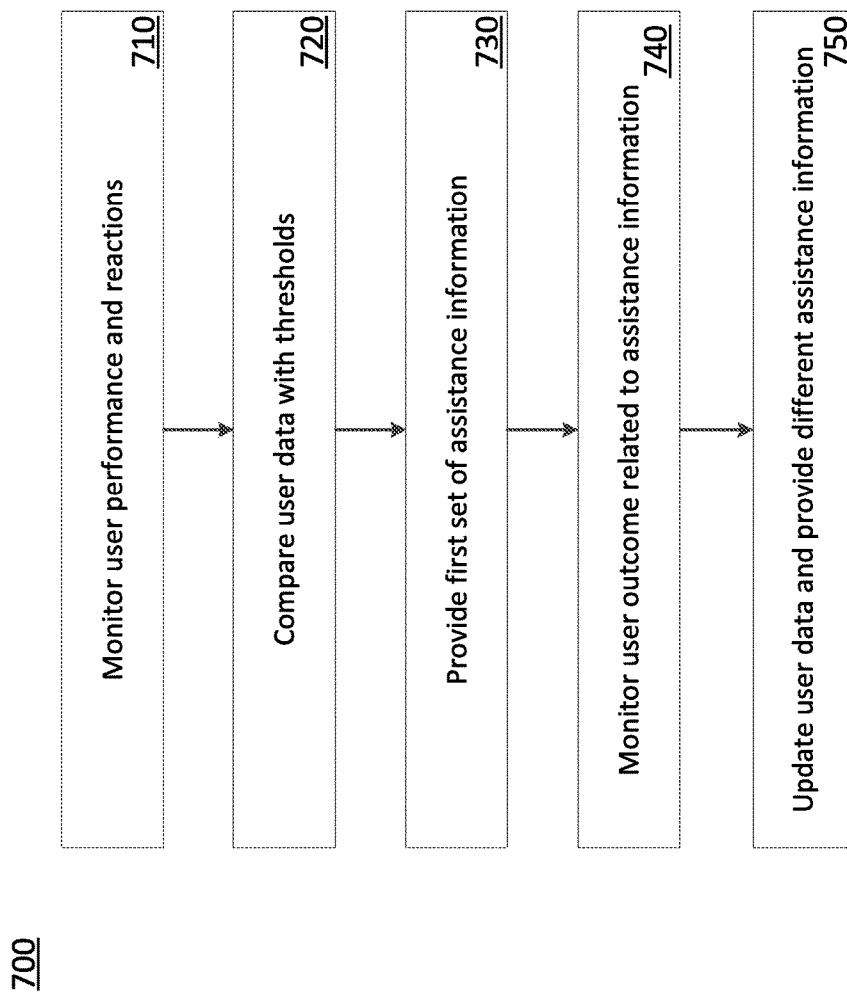

DYNAMIC ALLOCATION OF CONTEXTUAL ASSISTANCE DURING GAME PLAY

BACKGROUND

Field of Invention

The present invention generally relates to video games. More specifically, the present invention relates to the dynamic allocation of contextual assistance during game play.

Description of the Related Art

Video games have existed as far back as the 1950s. They initially began as simple games and simulations used by computer scientists for the purposes of research. Early video games such as Pong introduced the general public to games that consisted of simple gameplay mechanics. As the video game industry grew, the video games themselves have become more complex in their design and operation. Many present day video games include different puzzles required to be solved in order to overcome obstacles included within the game. For example, there may be a specific order of actions that need to be performed, specific objects that may need to be gathered, or specific targets that need to be hit before an obstacle is overcome.

Since the video games are generally designed for a broad audience, puzzles that are easy to some players may be difficult to other players. Since some puzzles may be central to the progression of the video game, being unable to complete some puzzles may restrict further enjoyment of the video game. This may result in a portion of the video game player base to become frustrated and potentially negatively affect the experience of the player with the game.

Although players do have access to sources of information that have hints and walkthroughs directed at addressing the various challenges within video games, the use of the information may not be ideal. Generally, players would need to consult a source (e.g. guide book, website) that takes the user away from the current video game experience. The information would need to be searched which requires time and effort on behalf of the user. Sometimes the information is too detailed and the information that the player is requesting is merely a hint in the right direction or the information is not sufficient and the user requires more detailed assistance. Other times, the information may not be sufficient to overcome the current challenge and the user would still be stuck.

The inability to overcome the challenge may just provide a negative experience such that the user no longer feels enjoyment in playing the video game. In some situations, prolonged periods of negative experiences could influence the user to stop playing the game and possible deter the user from playing the game in the future.

In view of the above, there is a need for systems and methods that are capable of providing the appropriate amount of gameplay assistance to the player based on the current reaction from the user so that the user is provided sufficient assistance to avoid the user getting too frustrated without spoiling the experience of the video game too early.

SUMMARY OF THE CLAIMED INVENTION

A system for dynamic allocation of contextual assistance during gameplay is presently claimed. The system includes a first party platform that is used to obtain user data that indicates a user level of frustration. The system also includes an assistance server that stores assistance information associated with the video game, wherein the assistance server transmits corresponding assistance information that assists the user to overcome a challenge within the video game. Lastly, the system includes a performance server that monitors the user data in order to provide corresponding assistance information. In particular, the performance server monitors user data to identify a level of frustration of the user, compares the level of frustration against thresholds that correspond to assistance information, and instructs the assistance server to provide the user with corresponding assistance information. The performance server then monitors the user subsequent receipt of the assistance information. If the user has not yet overcome the challenge, the performance server identifies an updated level of frustration of the user and instructs the assistance server to provide additional assistance information. Once the user has overcome the challenge, the performance server can modify a user profile associated with the user in relation to the monitored user data.

A method for dynamic allocation of contextual assistance during gameplay is presently claimed. The method includes storing assistance information associated with the video game that is provided by an assistance server corresponding to information that assists the user in overcoming a challenge within the video game. The method also monitors the user data to identify a level of frustration of the user. The identified level of frustration is compared against pre-determined thresholds that correspond to assistance information that can be provided to the user. Based on the comparison, the assistance server is instructed to provide corresponding assistance information. The user is monitored after receiving the assistance information to identify whether they have overcome the event. If they have not, an updated level of frustration is identified and is used to instruct the assistance information to provide additional assistance information until the user. Once the user successfully overcomes the challenge, the user profile can be modified. This modification may include updating a general trend of the user performance that includes threshold information.

BRIEF DESCRIPTION OF THE DRAWINGS

FIG. 7 illustrates a method for dynamically allocating contextual assistance during gameplay.

DETAILED DESCRIPTION

Figure 1:
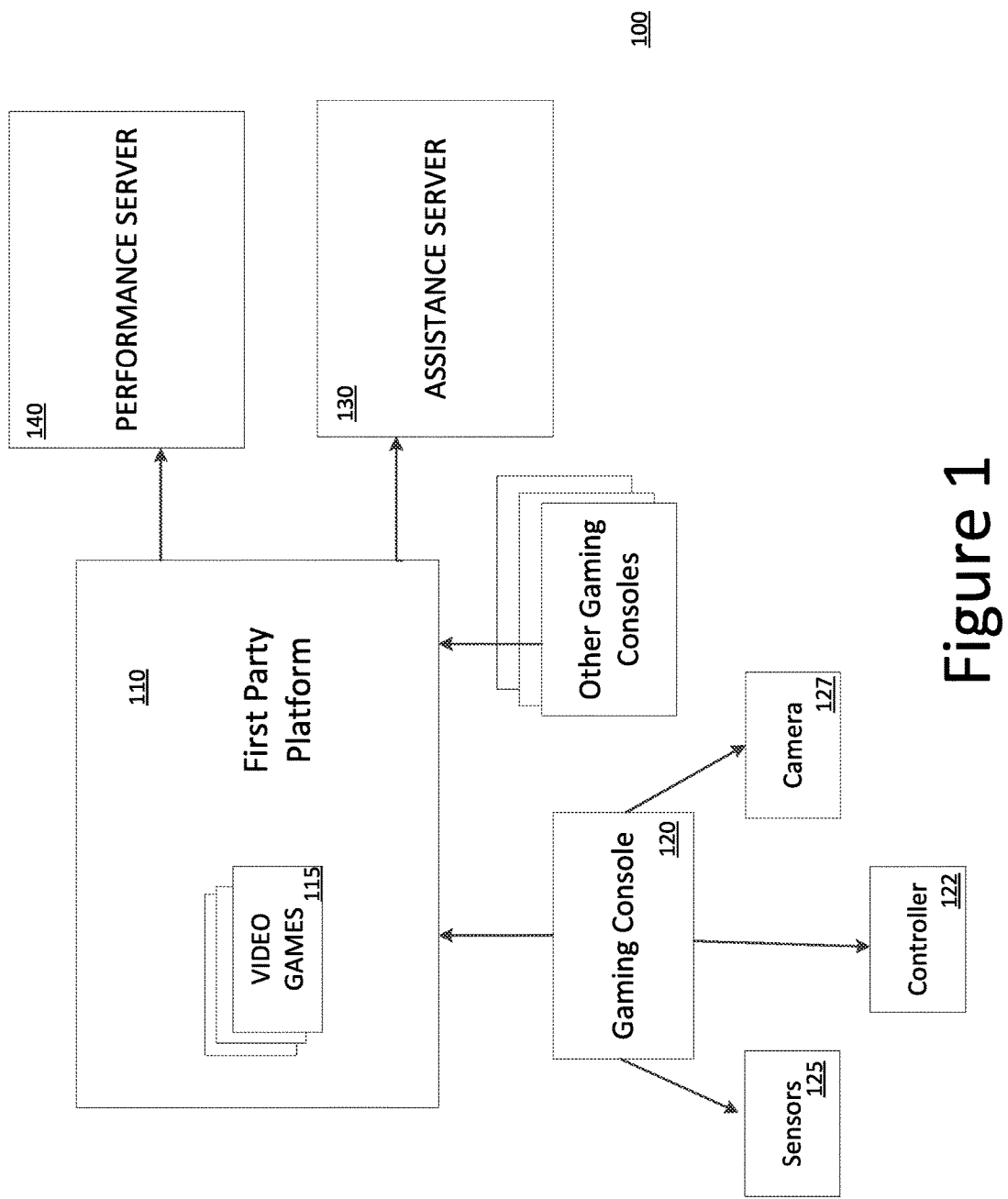
FIG. 1 illustrates a system for identifying player engagement for the purpose of generating contextual game play assistance.

The present disclosure describes methods and systems directed towards a dynamic allocation of contextual assistance during gameplay. By analyzing user gameplay and reactions of a user while the user is participating in a video game, appropriate gameplay assistance (such as hints, advice, or walk-through information) can be assigned. The different assistance information can be offered and/or provided to the user based on a current state of the user performance (e.g. reactions) within the game. Initially, less detailed instructions (e.g. hints, advice) may be provided to direct the user in a manner to assist the user in figuring out the solution of a challenge by themselves. However, as the user becomes more frustrated, more detailed instructions (e.g. walk-throughs) can be provided that provides more of a step-by-step guidance in assisting the user to overcome the current challenge. Short of completing the challenge for the user directly, the detailed instructions may reveal one or more different possible solutions for the current challenge. The system and methods allow for customization of what type of gameplay assistance can be provided to each user as each user may have different thresholds of frustration or preferences regarding the types of assistance they would like to receive within the video game. In this way there is a balance between assisting the user to minimize the level of frustration and letting the user experience the game (e.g. minimize spoilers).

The methods and systems of the present invention would monitor user gameplay information in order to identify what type(s) of hints, advice, or walk-through information could be provided to the user. The information can be based on the current level of frustration of the user with the obstacle caused, for example, by the repeated failure of the user to overcome the obstacle. The current level of frustration of the user can be compared with 1) pre-determined levels of frustration configured based on each user, or 2) pre-determined levels of frustration configured based on a normalization of all known gameplay information of other users who have also played the same video game. In some situations, a combination of both user specific configurations and normalization of gameplay information from other users could be used as well.

The present disclosure also describes methods and systems directed at proactively monitoring user gameplay information in order to identify what type(s) of gameplay assistance such as hints, advice, or walk-through information could be provided to the user and provide the identified information prior to the user potentially being too frustrated to the point of giving up. To do so, the methods and systems would process the gameplay information about the user performance within the game along with information obtained from different sources (e.g. sensors, microphones, cameras) in order to make a determination as to the current temperament of the user regarding the game. Using information associated with the user and/or information related to other users, different thresholds of frustration can be identified whereby different types of information can be offered to the user to assist in overcoming the obstacle in order to prevent the user from becoming too frustrated with the video game. As the user becomes more frustrated with repeated failures to the same challenge within the video game, the methods and systems would dynamically change what types of assistance information will be offered and/or provided to the user upon request.

As described herein, failure relates to a user performance (e.g. user attempts) with respect to a particular objective within the game where the user fails to complete the objective (i.e. is unsuccessful). The objective may, for example, constitute a challenge such as solving a puzzle within a pre-determined time limit or defeating an enemy. The user is unsuccessful in the attempt in completing the objective when the conditions for completing the objective are not satisfied. In the above example, this may involve the user not solving the puzzle within the pre-determined time limit or taking too much damage or repeatedly dying to the same enemy before the enemy is defeated. Failure can also be measured based on monitoring a number of successive attempts by the user on the same objective over a period of time where little or no progress has been made.

As referenced herein, the types of assistance provided to the user via the present invention can range from in the type and amount of information that is provided to the user with respect to a particular challenge within the video game. For example, a challenge may include solving a puzzle, completing a quest, or defeating an enemy within the game in order to advance. Hints may generally refer to information that points the user in a general direction regarding how to resolve the puzzle. For example, hints may be directed at identifying an important feature or mechanic about the puzzle. Advice may generally identify what the user has previously done in the past (via gameplay data) and provide information directing the user to try a different strategy. For example, advice may be directed at providing a suggested alternative choice at a particular point of the puzzle (where the user may have consistently chosen the wrong choice) that could direct the user in resolving the puzzle. Lastly, walk-through information may generally refer to a step-by-step guide instructing the user how to overcome the challenge. This information may include, for example, providing text-based instructions or an accompanying video describing how to overcome the challenge. In some embodiments, the walk-through information may include an in-game avatar (i.e. ghost) that the user can mimic in order to overcome the challenge. These are just examples of the types of assistance information characterizations that can be used. Different categories and labels can be associated with the assistance information that can be provided to the users that need assistance within the video games.

FIG. 1 illustrates a system 100 for identifying player engagement for the purpose of generating contextual game play assistance. The system 100 aims to characterize the status (e.g. mood/frustration level) of the user alongside the progression of the user within the video game (e.g. location, time spent, experience) based on gameplay information from the video game in order to provide appropriate assistance within the video game. Different thresholds can also be assigned for the user that provides varying degrees of assistance based on the current status of the user so that different types of information can be catered to the user. With each of the different thresholds, corresponding assistance information can be assigned. The assigned assistance information for each threshold may be specific to the user or may be based on normalized gameplay information across all users who have played the same video game.

The system of FIG. 1 includes a first party platform 110 that is associated with the video games 115 being played by the user. As described herein, the first party platform 110 may coincide with a network that supports the play of video games 115 on various gaming consoles 120 from which users would participate. Some of these video games 115 may be played off of each user console 120 via a single player experience. In situations where the video games 115 involve multiple users (e.g. multi-player), the first party platform 110 can assist in the execution of the networking features that allows multiple users to participate within the same instance of the video game 115.

The first party platform 110 may include various application programming interfaces (APIs) and related software that facilitates the present invention. For example, the first party platform 110 may include applications that track/monitor the gameplay information associated video games 115 associated with the first party platform 110. The gameplay information would include user location, progress, and statistics that can be used to identify what types of assistance (e.g. hints, advice, walk-through) the user would be interested in. Furthermore, the first party platform 110 may also facilitate in associating/assigning the types of assistance information (from the assistance server 130) with particular user performance (from the performance server 140) specific to each user so that the user can receive the appropriate assistance information.

The tracking features of the first party platform 110 can also be used to collect information from other users. The collected information from other users may be used to compile types of assistance information that can be used (e.g. hints, advice, walk-throughs) for others. For example, other users may provide commentary or video recordings regarding various challenges within the video games that can be provided to the first party platform 110. Some users may be characterized as being 'experienced' or 'professional' based on past achievements and the associated gameplay information and/or commentary offered by these users may be emphasized as being possible assistance information that can be provided to users who need assistance overcoming challenges within the same game.

Furthermore, the collected information obtained via the tracking features of the first party platform 110 may also be used to characterize various thresholds that users may experience with respect to frustration regarding challenges within the video games. The collected information may be only from the user but can also include other users who have also played the same video game. The collected information can be used by the performance server 140 to establish thresholds of frustration where different types and/or amounts of assistance information can be provided to the user. Generally, as the user becomes more frustrated at failing the same challenge, more detailed assistance can be provided so that the user can eventually overcome the challenge and advance within the video game. These thresholds may be based on individual user information or user input but can also be established based on normalized information (e.g. frustration levels) from users who have played the same video game.

Default thresholds (prior to those that are customized based on user data or data from other players) may initially be set by each video game. These default thresholds, may be set (for example by the developer of the game) based on prior trends of related frustrations that players have experienced.

The assistance information provided from other users playing the same video game as the user may be processed and stored in an assistance server 130 associated with the video game 115. The type of information can be characterized based on how detailed the information is. Short commentary can be labeled as a "hint" or "advice" while recorded gameplay or longer commentary can be labeled as "walk-through." Based on the type of assistance being requested by the user, corresponding assistance information can be retrieved from the assistance server 130. This assistance server 130 may be associated with the first party platform 110 or can be overseen and managed by a third party. Further details regarding the assistance server 130 will be provided below with reference to FIG. 4.

The first party platform 110 will be associated with a plurality of different video games 115. Information related to these video games 115 may be stored with the first party platform 110. In some embodiments the video games 115 may also be stored in a separate database that can be accessed by the first party platform 110. In any case, the first party platform 110 would be capable of accessing the necessary information about the video games 115 in order to facilitate user participation in the video games with other users each using their user computing device 120 (e.g. console). For the times where the user is only participating by themselves (and thus do not need the capabilities of the first party platform 110 to connect with other users), the first party platform 110 can retrieve the necessary information and transmit it to the appropriate user computing device 120 that the user is using. Such video game-related information being transmitted by the first party platform 110 to the user computing device 120 may include actual information needed to run the game such as updates/patches that provides the user with additional content or addresses issues within the video game.

The user computing devices 120 as illustrated in the figure facilitate user participation within the video games 115 associated with the first party platform 110. Exemplary computing devices 120 as described herein include gaming consoles. Other computing devices such as laptops, desktops, smart phones, tablets, and various other mobile/hand-held computing devices are also useable in different embodiments. To facilitate identifying user engagement and generate contextual game assistance, the user computing device 120 would generate video game-based information that would characterize the user progress within the game. For example, such gameplay information may include where the user is located within the game, what event/challenge/obstacle the user is currently participating in, how long the user has been currently engaged in the event/challenge/obstacle, and current statistics of the user character/avatar within the game.

The gameplay information obtained from one or more user computing devices 120 could be used to characterize performance of the user. As described above, gameplay information from the user, could be used to characterize performance of the user but could also be normalized with gameplay information from other users who also play the same video game. In some embodiments, the characterization of the user performance can be performed, for example, by the first party platform 110, by the video game itself 115, or by a third party. The gameplay information would provide assistance in identifying the types of hints, advice, or walk-through information the user would be interested in as well as the specific information that would assist the user to overcome the current event/challenge/obstacle based on the current state of the user (e.g. level of frustration). For example, if the user has been stuck on the same event/challenge/obstacle for 5 minutes, the type of information being offered can be different than if the same user is still stuck on the same event/challenge/obstacle after 30 minutes. Chances are, the frustration level of the user is greater after 30 minutes than after 5 minutes and in some cases, users may be deterred from continued play of the same video game if they are still stuck on the same event/challenge/obstacle for longer periods of time.

The threshold used to identify when the user should be offered/provided assistance information and/or what types of assistance information should be offered/provided to the user can be established in many different ways. Additional details regarding the assignment of gameplay assistance based will be provided below with respect to FIG. 5 (associated with the performance server 140) and. The user may establish thresholds for the different types of assistance information, the thresholds may be preset, or thresholds may be customized over time based on the specific user reaction or a plurality of user reactions to events/challenges/obstacles within the video games. Although there are exemplary three different types of assistance information described herein (e.g. hint, advice, walk-through), different characterizations and types of assistance information can be possible. Furthermore, any number of different thresholds for offering/providing these assistance information could also be established. For example, pre-determined thresholds used to assign assistance information may correspond to groupings as follows: 1) little to no frustration level, 2) moderate frustration level, and 3) high frustration level.

The corresponding gameplay assistance information assigned to each group provides increasingly detailed information that aims to assist the user in overcoming the challenge without providing the assistance too prematurely. For example, one may not want to provide a full solution to a challenge when the user fails the challenge only after one or two attempts. Similarly, providing only hints when the user is extremely frustrated at being stuck on the same challenge after a high number of attempts may not effectively provide assistance to the user. Ideally, as the frustration level of the user increases, more increasingly detailed assistance information will be provided to the user. Because the thresholds and the types of assistance information each user prefers can differ between users, the system 100 implements processes to assign assistance information to the appropriate thresholds for each user.

As noted above, the type of assistance information (e.g. hint, advice, walk-through information) provided to the user could be customized by the user. For example, the user could request only a particular type of assistance information (e.g. hints only) or indicate that a certain type of assistance information should not be provided (e.g. no walk-through information). Users may also be able to identify the source of assistance information that is preferred. For example, if particular third parties or other users provide assistance information, the user may be able to identify which sources the assistance information should come from preferably if available. In some instances, the video game may include assistance information associated with the video game. In this case, the user can indicate that this set of information is preferred if related information for providing assistance for the user to overcoming the particular event/challenge/obstacle is available.

Furthermore, users can also assign what types of assistance information should be available at different thresholds. For example, if an embodiment characterizes the user with three different thresholds of frustration, the user would be capable of identifying the types of assistance information and assign them to particular thresholds. Furthermore, the first party platform 110 may also be capable of analyzing how other users have assigned available assistance information to various thresholds used to characterize the user performance.

In further embodiments, additional information can be used to characterize the performance of the user within the game. As illustrated in FIG. 1, the user may utilize input devices (e.g. controller 122, sensors 125, and/or a camera 127) to provide user input to the console 120. The input devices could be used to facilitate user control within the video game. However, the input devices can also be used to track/monitor the user performance with respect to the event/challenge/obstacle. For example, the controller 122 and/or sensors 125 may include features that can be used to detect the biometric characteristic of the user (e.g. heartbeat, temperature) as the user is participating within the game. Microphones and/or cameras may be used to capture gestures, facial features, and/or voice inputs from the users.

There may be key identifiers (e.g. specific words, gestures, facial expressions) that can be associated with increasing frustration at the event/challenge/obstacle. For example, during initially participating in an event, the user may provide little to no reaction upon failing. However, continued failure of the same event may detect, for example, increased frequency of certain words (e.g. expletives), increased heart rate, and certain facial expressions/gestures that can indicate increasing frustration levels for the user. When these identifies are spotted, this may be an indication that some assistance information should be provided to the user (or at the very least the assistance information should be made available/offered) so that the user can obtain assistance in overcoming the event. The assistance information can be retrieved from the assistance server 130 at the time the user frustration level reaches certain thresholds or when the user makes a request for information via a user input (e.g. a button on the controller 122 that specifically requests assistance). However, it may also be possible to proactively download associated assistance information to the user gaming console 120 as well so that the information is immediately available upon request from the user. What assistance information to provide to the gaming console 120 can be based on the current event the user is participating in as well as the current frustration level of the user. The proactive download of assistance information will allow the information to be available immediately upon request thereby eliminating or at least minimizing delay for the assistance information to be provided to the user. Since some players may quit playing the game upon receiving a certain frustration level, the aim is to allow the user to overcome the event with some form of assistance information, lower the frustration level and allow the user to continue participating and enjoying in the video game.

The information that can be provided to the users to assist the user in overcoming the event may be requested on an as needed basis. The actual information from the assistance server 130 can be requested at the time the frustration level reaches a certain level. The first party platform 110

There may be many different ways to identify the key indicators of when assistance should be offered/provided to the user, as each user is capable of exhibiting frustration and dealing with frustration differently. For example, common facial expressions, gestures, and vocal expressions can be monitored for purposes of predicting when frustration is setting in for a user. Furthermore, tracking of a user's behavior over time can also provide adaptive indications of when a particular user is becoming frustrated. The system may first establish baseline measurements for identifiers of frustration (i.e. biometrics, facial expressions, vocal expressions) in non-frustrating parts of the game, such as during opening credits, cut-scenes, or menus. These measurements indicate the user's physical and behavioral state when not frustrated. Once baseline measurements have been established, deviations from that baseline can be correlated with frustrating situations in the game to establish a pattern by which to identify how a particular user expresses frustration. Cameras and/or other sensors may capture these reactions, associating them with the particular user as custom indicators of that user's frustration. For example, when a user fails to accomplish an objective in the game, his heart rate may spike and his facial expression may indicate anger. A different user might express frustration in the same situation through a shouted explicative. The system may learn the indicators of frustration for each individual user, and provide assistance content based to a particular user based on the known indicators of frustration for that user. In addition, users could also input their own identifiers as well as confirm and/or modify existing associations regarding indication of frustration for the user as appropriate so that the system can better identify when to offer assistance.

Figure 5:
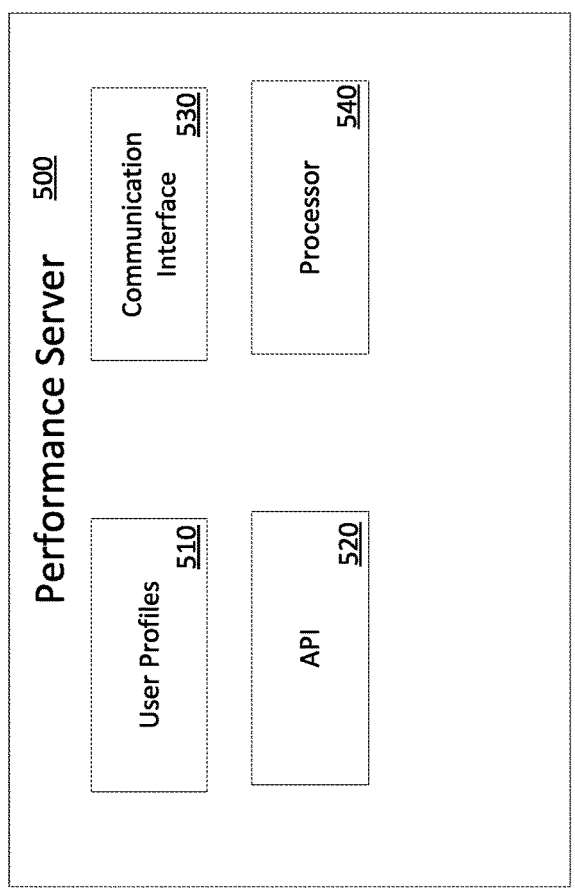
FIG. 5 illustrates an example performance server of FIG. 1.

Additional details regarding how the system can configure the key identifiers and thresholds for identifying when to offer and/or provide assistance for the user will be provided in FIG. 5 with respect to the performance server 140. In particular, configuration for the user can be based on information obtained about the user that can be processed, analyzed, and stored within the performance server 140. Each user can have a user profile that stores information over a period of time that could be usable to configure the key identifiers and thresholds for the user. User profiles may store a general trend of how users react and solve particular challenges. Furthermore, configuration for the user can also be based on information obtained from other users playing the same video game as well. Information regarding various user performances within the video game and, for example, frustration levels with various events/challenges/obstacles could be collected, processed, analyzed, and stored within the performance server 140. By comparing, for example, overall performance of other users facing the same event/challenge/obstacle, an average (or normalized) performance or frustration that other users experience can be obtained and used to compare with against the user. As such thresholds for when the system could offer or provide assistance to the user can also be adjusted based on the experiences of the specific user and/or other users who play the same video game. It may also be possible to have each user specifically customize their thresholds directly as well and identify the types of assistance associated with each threshold.

Figure 2:
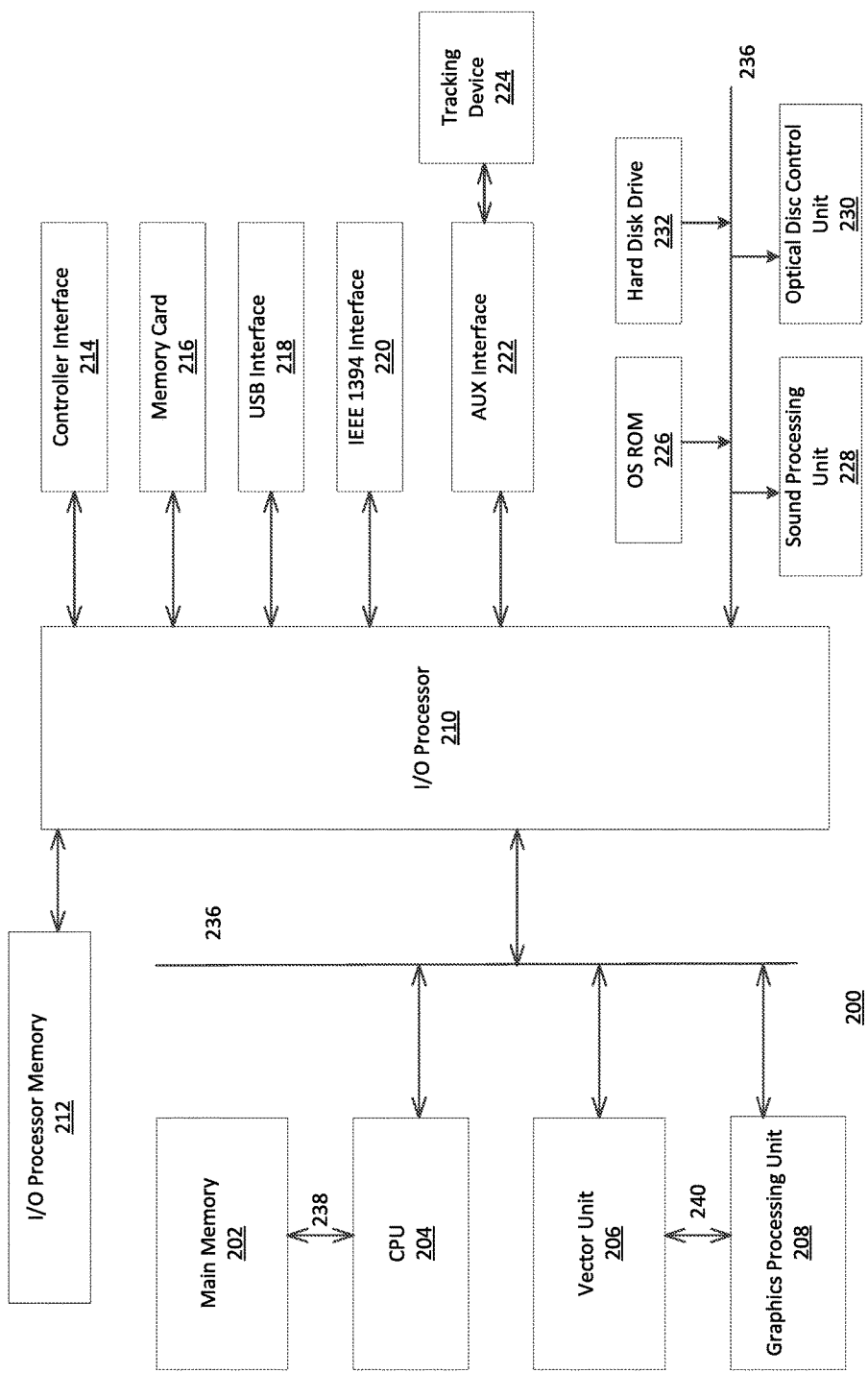
FIG. 2 is an example gaming console used in context of the system for identifying player engagement for the purpose of generating contextual game play assistance.

FIG. 2 is an example gaming console 200 used in context of the system for assigning contextual gameplay assistance based on gameplay data of the user of FIG. 1. The gaming console 200 (which in some cases may also include other computing devices such as desktops, laptops, tablets, and mobile devices) is a device that the user can utilize to play various video games associated with the first party platform of FIG. 1. Furthermore, the gaming console 200 allows the user to connect with the first party platform associated with the video games so that user gameplay can be monitored and recorded in order to identify the current player engagement (e.g. frustration level) and what types of assistance may be offered and/or provided to the player at the current time.

The gaming console 200 may include various elements as illustrated in FIG. 2, however, it should be noted that the elements are exemplary and that other embodiments may incorporate more or less than the elements illustrated. With reference to FIG. 2, the gaming console 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The gaming console 200 further includes an operating system read-only memory (OS ROM) 226, a sound processing unit 228, an optical disc control unit 230, and a hard disc drive 232, which are connected via a bus 234 to the I/O processor 210. The gaming console 200 includes at least one tracking device 224.

The tracking device 224 may be a camera, which includes eye-tracking capabilities. The camera may be integrated into or attached as a peripheral device to the gaming console 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to gaming console 200 that captures voice data. The microphone may conduct acoustic source localization and/or ambient noise suppression. The microphones may be usable to receive verbal instructions from the user to schedule, retrieve and display content on the gaming console 200.

Alternatively, tracking device 224 may be the controller of the gaming console 200. The controller may use a combination of built-in accelerometers and infrared detection to sense its position in 3D space when pointed at the LEDs in a sensor nearby, attached to, or integrated into the console of the entertainment system. This design allows users to control functionalities of the gaming console 200 with physical gestures as well as button-presses. The controller connects to the gaming console 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the gaming console 200 can also be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the gaming console 200 provides instructions via the controller interface 214 to the CPU 204. For example, the user may instruct the CPU 204 to store certain information on the memory card 216 or instruct the user device 200 to perform some specified action. Example controllers associated with the controller interface 214 may include a touch-screen, keyboards and game controllers.

Other devices may be connected to the gaming console 200 via the USB interface 218, the IEEE 1394 interface 220, and the AUX interface 222. Specifically, a tracking device 224, including a camera or a sensor may be connected to the user device having the first party portal 200 via the AUX interface 222, while a controller may be connected via the USB interface 218.

Figure 3:
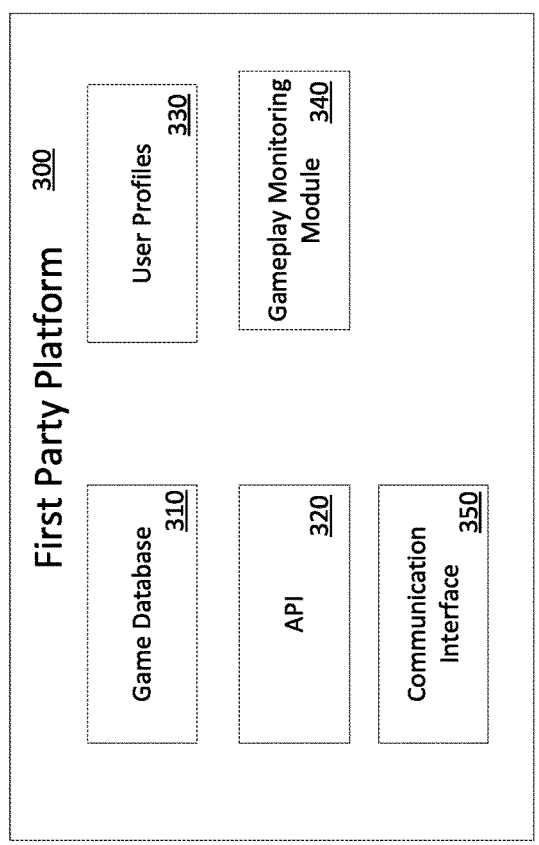
FIG. 3 illustrates an example first party platform of FIG. 1.

FIG. 3 illustrates an example first party platform 300 of FIG. 1. As described herein, the first party platform 300 is a network used to integrate and support video games associated with a particular platform (e.g. gaming console). The first party platform 300 may be implemented via a plurality of computing devices (e.g. servers) and/or within the cloud.

The first party platform 300 includes a number of different features that can be used to identify player engagement for the purpose of generating contextual game play assistance as well as assign what types of gameplay assistance should be offered to the user. As illustrated in FIG. 3, the first party platform 300 includes a database 310 of all video games that are currently supported by the first party platform 300. The game database 310 may include information used by the gaming consoles to execute instances of the game in the cloud using the first party platform 300. This may allow users to participate in multiplayer video games with other users on a shared gaming network. In some embodiments, users may download necessary information from the game database 310 to execute the particular video game on the user gaming console. This may be beneficial in allowing users to download updates (e.g. downloadable content, patches) for executing a single player game directly on their gaming console.

Since new video games are constantly being published and released for user consumption, an application programming interface (API) 320 is provided within the first party platform 300 to allow publishers to update the game database 310 with new information used for new video games as needed. The API 320 includes an interface that allows for publishers to upload new video game information to be stored within the game database 310.

Users may also have their own user profiles 330 stored within the first party platform 300. The user profiles 330 may include information such as what video games the user has played, gameplay details regarding progress within each of those video games, as well as information (e.g. achievements, trophies) regarding how well the user has performed within each of those video games. The user profile 330 may also include numerous other statistics that can be used to further characterize the user (e.g. gameplay behavior) associated with the video games with the first party platform as well as preferences regarding the types of assistance information the user would like to receive and when (e.g. thresholds) the assistance information should be offered and/or provided. In this way, the user profile 330 can be used as a way to view a general trend of how users react to particular challenges within the video game with assistance information over a period of time.

The gameplay monitoring module 340 receives information from the various video games being played by the user (and in some embodiments from other users playing the same video games). In situations where the video games have ways for tracking user progress during gameplay, such information can be provided for direct use by the gameplay monitoring module 340. For example, such information may include user performance such as time played log, accuracy, kill-death ratio, and character statistics within game. This information can be used to characterize a user performance within the video game and identify whether the user should be offered/provided assistance. This information can be transmitted to a performance server (illustrated in FIG. 5) using the communication interface 350.

The communication interface 350 facilitates the transmission of information between the first party platform 300 and various other servers (e.g. assistance server, performance server) regarding the types of assistance information being offered/provided to the users or identifying when the assistance information should be offered/provided. The communication interface 350 also allows the users to communicate with the first party platform 300 via their consoles.

Figure 4:
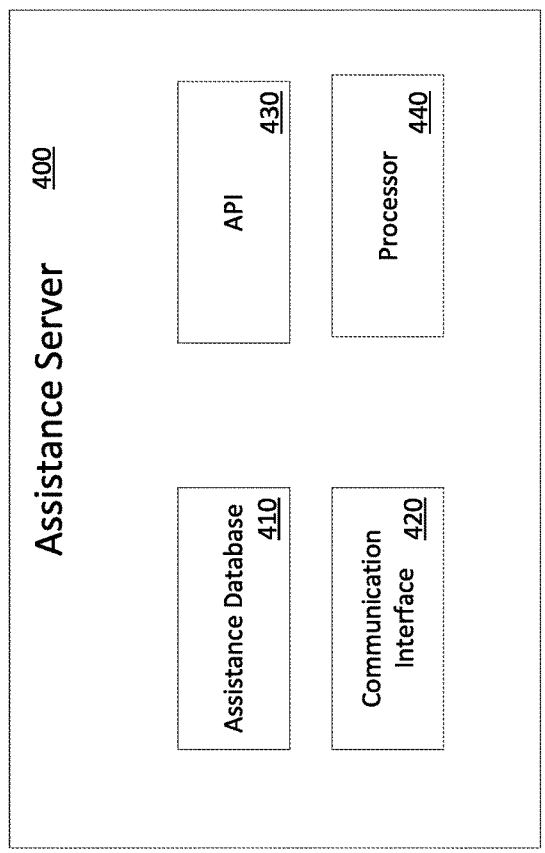
FIG. 4 illustrates an example assistance server of FIG. 1.

FIG. 4 illustrates an example assistance server 400 of FIG. 1. The assistance server includes a database 410 used to store and organize the various assistance information for various video games associated with the first party platform. The assistance server also includes communication interfaces 420 and/or application programming interfaces (APIs) 430 that allows association information to be uploaded and/or modified within the database. Lastly, the assistance server may have an assistance information processing application 440 that allows for the characterization, labeling, and rating of the assistance information associated with the assistance server 400.

The assistance database 410 stores all the various assistance information that may be offered and/or provided to the user. The assistance information may be organized, for example, based on the applicable video game. Further organization can include type of assistance information, source/provider of the assistance information, when the assistance information was uploaded or last modified, rating/accuracy of the assistance information, and label regarding the event/challenge/obstacle the assistance information pertains to.

To facilitate building up the assistance database 410 that includes the assistance information for the various video games associated with the first party platform, the assistance server 400 may include communication interfaces 420 and/or application programming interfaces 430 that allow various users to upload new assistance information and/or modify existing assistance information. Such assistance information can be labeled by the source regarding the type of information being uploaded (e.g. hint, advice, walkthrough) as well as referencing the identity of the source for the assistance information.

As assistance information is provided to users playing the video game, the recipients of the assistance information can provide ratings regarding how useful the assistance information is. These ratings can be collected via user input provided via their consoles and aggregated to be associated with the particular assistance information stored within the assistance server. The ratings can be received, for example, via in-game comments provided by the users that are transmitted to the assistance server using the communications interface 420. Ratings from the users who were provided the assistance information could be beneficial in identifying what assistance information is accurate and beneficial. Example rating scale could include a range from 1-5 (with one being not useful to five being extremely helpful). Various rating scales can be used to identify those information that is inaccurate or unhelpful and distinguishable from the information that was beneficial, clear, and accurate. Users may also provide commentary regarding why such assistance was unhelpful and inaccurate. The commentary may be beneficial in identifying those comments that could be flagged or removed. Furthermore, the assistance information of each type with higher ratings may be emphasized. Furthermore, contributors of consistently higher rating assistance information can be featured or emphasized when assistance information is being queried for the user.

Users can also provide requests for specific types of assistance information as well as assistance information from various sources (e.g. contributors). The assistance server, in organizing the assistance information stored within the database, allows for this customization of the types of assistance information that is being received by the user. The assistance information processing application 440 can ensure that the appropriate assistance information (e.g. pertaining to the corresponding video game, the preferred type/source) is selected for the user. The assistance information processing application 440 can also process the ratings for the assistance information stored within the assistance database 410 and provide/update an overall rating that users can reference. The overall rating can be used to rank or highlight more accurate or beneficial assistance information. Users may use the ratings, for example, to filter out assistance information that have ratings below a threshold or to indicate that assistance information having a certain rating or higher should be preferred.

FIG. 5 illustrates an example performance server 500 of FIG. 1. The performance server 500 is used to identify when assistance information should be provided to users on a per-user basis. This is done by analyzing and comparing user performance within the video game and other user-related information (e.g. vocal, visual, biometric information). It is also possible to analyze and compare user performance with other user performance within the same video game.

The performance server includes user profiles 510 that store information about each user. For example, the user profiles 510 may generally have information regarding overall performance thresholds indicating when to offer and/or provide different types of assistance to users. Since different users may experience frustrations or have other issues in video games differently than other players, each user profile can stored the identified behavior of the user experiences frustrations (e.g. if the user becomes easily frustrated). In this way, assistance information can be provided accordingly for each user.

The user profiles 510 may initially begin with standard indicators (e.g. thresholds) of when frustration may occur. The standard indicators can be based on calculations performed on the user and/or other various users playing the same video game at the same obstacles within the video game. With respect to analyzing user performance, detection of an expletive can be used as an indicator of when frustration may begin setting in. Other examples can include increased heart rate and detection of certain gestures or facial expression by the user being observed can also be used. As the performance server 500 receives gameplay data and/or user-related data from the first party platform, the processor 540 can characterize and predict when the user actually is becoming frustrated and modify accordingly the respective profile of the user. Furthermore, the user may also be capable of modifying and/or adding to the user profile the indicators regarding what the performance server may look for to detect increasing frustration or may specifically adjust or add to the thresholds that were established for the user. Furthermore, aggregating user information from other users playing the same game can also be used to adjust the user thresholds to be consistent with what a majority of the other users experience within the same game.

The user profile can also be modified to identify the types of assistance information to suggest for the user and the associated thresholds the information should be offered/provided. For example, the performance server may have three different thresholds where different levels of frustration can be identified (e.g. level A, B, and C with A being the least and C being the most). The user could have the different levels configured over a period of gameplay data obtained and identify the types of assistance information that may be beneficial. For example, users may want to attempt an event 5 times before getting a hint from the assistance server. If the user is still unable to overcome the event after 5 more times with the first hint, some advice may be provided. After additional 5 times with the advice, further advice or hints could be provided. Finally after an additional 10 times, the user may request a walkthrough. However, if the user exhibits signs of increased frustration (e.g. detection of an expletive once every few seconds) that increases in frequency, this may indicate an increased need to provide the next level of assistance. Furthermore, this may induce a modification to the threshold (e.g. every 3-4 times instead of previous 5 times).

As stated, the user can customize the types of assistance they receive within the game and assign particular types of assistance information to certain thresholds. Personal preferences can also be used to tailor the types of assistance information that is made available to the user. For example, some users may never wish to receive walk-through information no matter how frustrated they are while others may wish to receive walk-through information immediately. The user is capable of customizing and modifying their user profiles as needed.

However, absent user customization, the performance server 500 is capable of assigning types of assistance information that could be offered and/or provided to the user based on data of the user. As discussed above, the performance server 500 can establish various thresholds used to categorize different levels of frustration using information from the user, using information from other users playing the same game, and using user input from the user. With each threshold, an assignment of different types of assistance information provided such that certain assistance information would be made available and thus more likely to be offered and/or provided to the user at a current time. In an exemplary embodiment, as users become more frustrated, an aim is to provide assistance information that will allow the user to overcome the current challenge. Therefore, more detailed and explanatory assistance information could be provided that provide direct solutions to the current challenge. In situations where the user is slightly frustrated, the user could be provided less detailed assistance information that may point the user in the correct direction (e.g. hints, advice) but still allow the user the ability to figure out how to overcome the current challenge.

The labeling of assistance information as, for example, hint or walk-through, could be used to characterize the type of assistance particular assistance information will provide to the user. The label can be used (by default) to assign when that assistance information may be provided to the user with respect to a particular threshold.

The performance server 500 also includes an application programming interface 520 that allows for the uploading and/or updating of user profiles 510 stored on the performance server 500. For example, the user can utilize the application programming interface 520 to modify existing information stored in the user profile 510 that may include thresholds regarding when or what assistance information would be offered/provided to the user within game. The application programming interface 520 can also be used to modify or add other functionalities to the monitoring 540 or processing 540 features of the performance server 500 as appropriate.

The communication interface 530 of the performance server 500 facilitates communication with other servers (e.g. assistance server) and the first party platform. By using the communication interface, the performance server can provide each current performance data and/or user profile of the user to the assistance server so that the assistance server can select the appropriate assistance information (via the assistance information processing application) that can then be sent to the first party platform. The communication interface 530 also allows the performance server 500 to receive gameplay data and/or user-related data (e.g. sensor, camera, microphone) from the first party platform. The information coming from the first party platform can be used to characterize the current performance of the user and identify, for example, the current frustration level of the user. Based on various thresholds, for example, compared with pre-defined parameters set by the system or the user, a particular type of assistance information may be recommended.

The performance processor 540 analyzes the data about the user (e.g. gameplay, sensor, biometrics) coming from the first party platform that can be used to characterize the current performance of the user within the game. By comparing the performance of the user, the performance processor 540 can identify (based on previously calculated thresholds) when a user may begin feeling frustrated with a particular aspect of the video game. For example, if the user keeps failing to complete an objective, the rate of failure of the user may be compared with a pre-determined threshold (e.g. 5 times) or compared with others rate of failure (e.g. average 7 times). For example, the performance processor 540 can use the user profile 510 (which may have pre-determined thresholds or thresholds calculated based on past performance) or use calculations pertaining to a plurality of similar players who have played the same video game and experiences similar issues at the same objective to determine if the user could potentially be experiencing frustration.

Furthermore, other indicators such as increased heart rate, detection of moisture at the controller from the hands of the user, or frequency of expletives could also be indicators that the user is becoming increasingly frustrated. All this information can be weighted and aggregated to determine a level of frustration that corresponds to a recommendation regarding what type of assistance should be provided.

Figure 6:
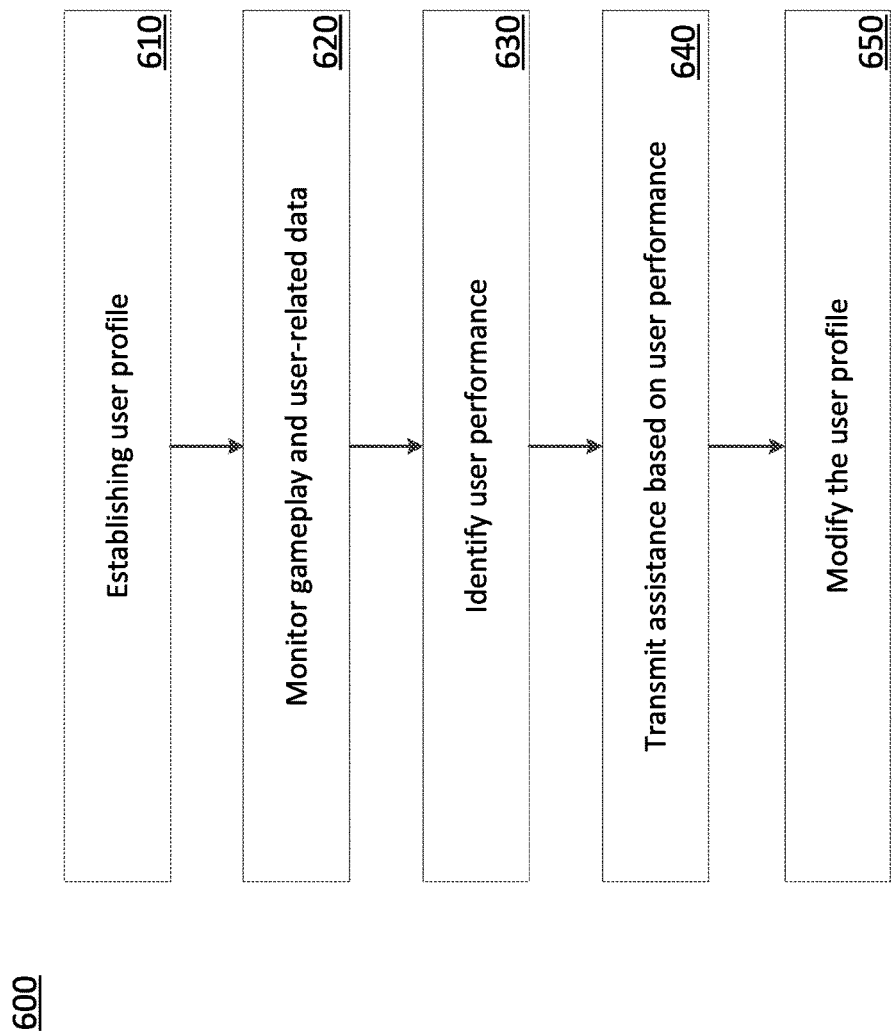
FIG. 6 illustrates a method for identifying player engagement for the purpose of generating contextual game play assistance.

FIG. 6 illustrates a method 600 for identifying player engagement for the purpose of generating contextual game play assistance. As described above, user gameplay and user-related information regarding a video game is obtained and used to identify user performance with respect to the video game. In situations where the user is repeatedly failing a particular event/obstacle/challenge, the method aims to identify when would be an appropriate time and what the appropriate assistance information that should be provided so that the user can advance within the video game.

In step 610, conditions regarding any user preferences regarding performance thresholds and/or assistance information can be provided by the user. If no such preferences are received, predetermined criteria can be used. The predetermined criteria can later be modified by the user and/or other entities based on user performance data obtained over time. For example, if the user is detected as being easily frustrated, the thresholds regarding when assistance information should be provided may be decreased.

In step 620, the user gameplay of a video game and any user-related data obtained via sensors or other devices can be monitored. These sets of data identify user performance within the game. For example, gameplay information may pertain to user statistics within the game such as time played, current event/location, character details, attempts, and current equipment. Some of the gameplay information would be used to identify what type of assistance information would be beneficial for the user. Other types of gameplay information could be used to identify if the user is becoming frustrated at having to repeat the same event or being stuck on the same event for an extended period of time.

Furthermore, user-related data obtained via sensors or other devices (e.g. controller, microphone, cameras) could be used to detect user mood over the same period of time. For example, detection of expletives, increased heart rate, or certain gestures or facial expressions could be indicative of increasing frustrations.

In step 630, a current user performance may be identified. The user performance would identify, for example, a user frustration level regarding the current event/obstacle/challenge that is preventing the user from advancing within the video game. This user performance may be based on various thresholds that correspond to different levels of frustration as well as associated with different types of assistance information that may be beneficial in alleviating the level of frustration and allowing the user to advance within the video game.

In step 640, the assistance information is provided to the user based on the identified current performance of the user. Based on the current performance of the user identified in step 630, different types of assistance information can be provided. With the aim of reducing frustration levels, less detailed hints and advice may be provided initially that are aimed at directing the user in the right direction with regards to overcoming the current event/obstacle/challenge within the game. However, as the frustration level increases and surpasses one or more thresholds, more detailed assistance may be necessary so that the user can finally overcome the event/obstacle/challenge and move on in the game.

In step 650, the user profile can then be updated. After the assistance has been provided in step 640, user gameplay and user-related data can then be monitored again to determine if the performance of the user improves and is able to progress within the video game. Generally, if the user overcomes the event with the assistance, the user will no longer exhibit indications of frustration or exhibit reduced signs of frustration. The processor of the performance server can correlate a degree of frustration for the user, the type of assistance that was provided and that it was beneficial for this particular instance. This information can be used to modify the user profile. For example, if the user frustration level was higher than the threshold that the user profile has when providing the corresponding assistance, the user profile may be updated to lower the threshold so that assistance can be provided earlier. An aim in lowering the threshold is so to prevent the user from reaching that high level of frustration in the future.

The frustration level of the user can also be compared with the general frustration level of other players within the same game facing the same event/obstacle/challenge. Based on whether the frustration level of the user is higher or lower than the general frustration level of the other players, the personal threshold level of the user can be adjusted accordingly since this may be indicative that the user is more or less frustrated than other players.

Steps 620-650 may be repeated for as long as the user is playing within the game so as to allow for an adaptive identification of player engagement within the video game. Based on the characterization of the user, the appropriate assistance directed at addressing the current event/obstacle/challenge that the user is stuck on could be provided.

The present system may not only be concerned with the type of assistance information that is provided based on the user performance. Other embodiments may also store different types of 'success' messages that can be provided to the user after detecting that the user successfully overcame the event/obstacle/challenge after receiving the assistance information. These 'success' messages may be stored within the performance server or other servers uniquely dedicated at providing the 'success' messages. The types of 'success' messages may vary from simple 'congratulations' to more extensive messages that include music, graphics and/or videos. Similar to how the assistance information attempts to reduce the frustration level of the user playing the video game, the 'success' messages also provide this support to the user as the user is now able to progress within the video game.

FIG. 7 illustrates a method 700 for dynamically allocating contextual assistance during gameplay. The allocation of contextual assistance during gameplay aims to provide assistance information to users that balance 1) an aim of reducing frustration of the user when users fail to overcome a challenge, and 2) allowing the user to experience the game without significant spoilers.

In step 710, the user gameplay of a video game is monitored. User data is obtained that includes gameplay data that is indicative of user performance (e.g. failure at a particular challenge) and user reactions (e.g. biometrics). Gameplay of the user playing a video game is monitored in order to characterize what challenge the user is attempting to overcome. Meanwhile the user reaction describes a current state of the user (e.g. frustration level of the user).

In step 720, the current state of the user can be compared with any number of different thresholds that are currently being used to offer and/or provide corresponding assistance information to the user. As noted above, thresholds may be established in a number of different ways to characterize different levels of frustration. Each game, genre, or type of challenge may have different overall threshold levels based on normalized data obtained from other users who have played the same video game. Furthermore, each user may have their own threshold levels based on past data obtained from the user. By using the thresholds and comparing it with the user current state, the first party platform can identify what corresponding assistance information (assigned to a particular threshold) could be offered and/or provided to the user. The assistance information can be further filtered or customized based on user input but at the very least, step 720 highlights a subset of available assistance information that can be offered and/or provided to the user.

In step 730, assistance information is offered and/or provided to the user based on the current state of the user and the compared threshold. Generally assistance information ranges from less detailed hints or advice to full detailed walk-throughs of different aspects of the video game. The more details involved in the assistance information, the more likely the user experience may be spoiled (e.g. the user is provided the solution without the experience of solving the challenge themselves). Thus an aim is to provide enough information to assist in the user in overcoming a challenge without interfering with the user experience (e.g. spoilers) of the video game. However, if the user is too frustrated and spend any more time, it may be necessary to provide the full details in the assistance so that the user can successful overcome the current challenge and advance within the video game.

Thus, in this step, generally limited information will be first provided to the user during a current challenge so that the user can still have the opportunity to experience and resolve the majority of the challenge by themselves. Hints and advice may generally direct the user in a correct direction for a solution such as choosing a particular path, or using a particular tool in situations where the user does not know where to begin. If the user has made some attempts on a particular challenge, hints and advice can suggest alternative possible methods as opposed to what the user has generally been attempting.

The user is able to customize the types of assistance information that can be offered and/or provided. Thus users may indicate that they may only want hints or advice (e.g. not walk-throughs) and that such assistance should not include any spoilers. It may also be possible that users may not care for hints or advice but may always want full details regarding a particular challenge upon request.

In step 740, the user is monitored subsequent receipt of the assistance information to determine an outcome of whether the assistance information was helpful or if additional assistance is still needed. In the situation where the user reaction and gameplay data corresponds to a low level of frustration, less detailed assistance (e.g. hints or advice) may initially be provided. Upon receiving assistance, if the user successfully overcame the current challenge, an indication of such may be provided to the first party platform. In this case, no further assistance information may be needed at this time. Furthermore, user data (e.g. biometrics) can be also monitored at this time to ensure that the user reaction (e.g. level of frustration) has decreased as well.

However, in situations where the user still fails to overcome the current challenge (e.g. still stuck in the same puzzle, same enemy is still killing the user), this may be indicative that further detailed information may need to be made available or provided to the user. User data can be monitored at this time to determine the user current reactions to the current challenge and may be used to expedite timing regarding when to provide the assistance information.

In step 750, the user profile is updated based on the monitoring and further assistance information can be provided as needed. As noted above, subsequent receipt of assistance information, if the user has moved on from the challenge, this may be noted within the user profile. For example, information such as the user's previous frustration level and the type of assistance information that was helpful in overcoming the challenge may be provided. This can be used to characterize (over time) a user's general behavior around a particular challenge.

However, if the user is unable to overcome the challenge, more detailed assistance may be needed. The information associated with how frustrated the user becomes and how detailed the information that is necessary for the user to finally overcome the challenge may be recorded in the user profile as well. This can be used to highlight particular characteristics of the user with particular challenges over a period of time. For example, the user may have more difficulty with a particular type of challenge compared to other challenges, may need more detailed information to assist in the user solving the challenge, and may also cause the user to become more easily frustrated as well. In contrast, other challenges may be easier, may need less detailed assistance, and does not frustrate the user as much.

In this way, the user profile can be updated to modify the thresholds and/or types of assistance information provided to the user in situations where a particular type of challenge appears within the video game. This allows for more granular customization of assistance for users. Furthermore, the types of assistance information suggested for each user can be based on the user profile. Since the system knows what types of assistance information works, it may be desired to provide a type of assistance information (during a next encounter of a particular type of challenge) preceding the type that works (e.g. advice when the last assistance information that was provided was a walk-through type) so as not to prematurely reveal all the information about a particular challenge. However, if users become quickly frustrated about a particular challenge or are not really proficient at solving such solutions, then it may be desired to provide the version of assistance information that allows the user to overcome that challenge as quickly as possible.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A system for dynamic allocation of contextual assistance during gameplay, the system comprising:
    a first party platform that obtains user data, the user data pertaining to user reactions to a video game, the user reactions indicative of a level of frustration;
    an assistance server that stores assistance information associated with the video game, wherein the assistance information corresponds to overcoming a challenge within the video game; and
    a performance server that:
        monitors the user data to identify the level of frustration in reaction to the video game,
        compares the identified level of frustration against pre-determined thresholds corresponding to the assistance information stored at the assistance server,
        instructs the assistance server to transmit the assistance information based on the comparison between the identified level of frustration and the pre-determined thresholds,
        monitors a first subsequent user data after the user receives the assistance information from the assistance server, the first subsequent user data indicating that the user has not overcome the challenge and includes an updated level of frustration,
        instructs the assistance server to transmit the assistance information corresponding to the updated level of frustration,
        monitors a second subsequent user data after the user receives the additional information from the assistance server, the second subsequent user data indicating that the user has overcome the challenge, and
        modifies a user profile associated with the user, the user profile storing a general trend of performance by the user that correspond to the pre-determined thresholds, wherein the modification modifies the general trend of the performance by the user based on the monitored first and second subsequent user data.

2. The system of claim 1, wherein the first party platform includes sensors used to collect biometric information from the user, the biometric information used to characterize the user reactions to the video game.

3. The system of claim 2, wherein the biometric information collected by one of the sensors includes the heart rate of the user.

4. The system of claim 1, wherein the first party platform also includes a microphone used to collect voice inputs from the user, the voice inputs used to characterize the user reactions to the video game.

5. The system of claim 4, wherein the voice inputs includes expletives.

6. The system of claim 5, wherein the microphone also detects a frequency of the expletives.

7. The system of claim 1, wherein the first party platform includes a camera used to capture images of facial expressions the user, the images of facial expressions used to characterize the user reactions to the video game.

8. The system of claim 1, wherein the pre-determined thresholds are based on the video game.

9. The system of claim 8, wherein the pre-determined thresholds are based on a current difficulty of the video game.

10. The system of claim 1, wherein the pre-determined thresholds are based on normalized data from other users who played the same video game as the user.

11. The system of claim 1, wherein the pre-determined thresholds are unique to the video game.

12. The system of claim 1, wherein the pre-determined thresholds are unique to a genre of the video game.

13. The system of claim 1, wherein the pre-determine thresholds are unique to the user.

14. The system of claim 1, wherein the general trend characterizes user data regarding the challenge over a period of time.

15. A method for dynamic allocation of contextual assistance during gameplay, the method comprising:
    storing assistance information associated with the video game, wherein the assistance server transmits corresponding assistance information that assists the user to overcome a challenge within the video game;

monitoring the user data to identify a level of frustration of the user within the video game;

comparing the identified level of frustration against pre-determined thresholds associated with corresponding assistance information to be provided to the user;

instructing the assistance server to transmit assistance information based on the comparison between the identified level of frustration and the pre-determined thresholds;

monitoring a first subsequent user data after the user receives the assistance information from the assistance server, the first subsequent user data indicating that the user has not overcome the event and includes an updated level of frustration;

instructing the assistance server to transmit assistance information based on the updated level of frustration;

monitoring a second subsequent user data after the user receives the additional information from the assistance server, the second subsequent user data indicating that the user has overcome the event; and modifying a user profile associated with the user, the user profile storing a general trend of the performance of the user that correspond to the pre-determined thresholds, wherein the modification modifies the general trend of the performance of the user based on the monitored first and second subsequent user data.

* * * * *